United States Patent [19]
Wybrow

[11] Patent Number: 5,280,385
[45] Date of Patent: Jan. 18, 1994

[54] CONTAINER INCLUDING A VIEWING AID

[76] Inventor: Brian R. A. Wybrow, 32 Sunningdale Avenue, Eastcote, Ruislip, Middlesex HA4 9SR, Great Britain

[21] Appl. No.: 773,913
[22] PCT Filed: Apr. 25, 1990
[86] PCT No.: PCT/GB90/00635
  § 371 Date: Dec. 23, 1991
  § 102(e) Date: Dec. 23, 1991
[87] PCT Pub. No.: WO90/13123
  PCT Pub. Date: Nov. 1, 1990

[30] Foreign Application Priority Data
  Apr. 25, 1989 [GB] United Kingdom ............ 8909341
  May 9, 1989 [GB] United Kingdom ............ 8910586
  Jul. 17, 1989 [GB] United Kingdom ............ 8916343

[51] Int. Cl.5 .......... G02B 5/04; G02B 7/18; B65D 33/04
[52] U.S. Cl. .......... 359/438; 359/837; 206/459.5; 40/312
[58] Field of Search .......... 359/438, 439, 436, 837, 359/831, 833, 834, 871, 367; 206/459.5, 45.31; 40/312

[56] References Cited
U.S. PATENT DOCUMENTS

| | | |
|---|---|---|
| 3,638,955 | 2/1972 | Wada . |
| 3,712,262 | 1/1973 | Kisselmann et al. ............ 359/438 |
| 3,786,626 | 1/1974 | Hurt ............ 359/438 |
| 3,887,791 | 6/1975 | Kitchens ............ 359/438 |
| 4,099,851 | 7/1978 | Rethore ............ 359/837 |
| 4,274,714 | 6/1981 | Okamura ............ 359/871 |
| 4,673,994 | 6/1987 | Hida . |
| 4,869,582 | 9/1989 | Nakajima et al. ............ 359/871 |

FOREIGN PATENT DOCUMENTS

| | | |
|---|---|---|
| 2506300 | 8/1976 | Fed. Rep. of Germany ...... 359/438 |
| 2651618 | 5/1978 | Fed. Rep. of Germany ...... 359/438 |
| 2233641 | 1/1975 | France ............ 359/831 |

Primary Examiner—Jon W. Henry
Attorney, Agent, or Firm—Barnes & Thornburg

[57] ABSTRACT

An arrangement for enabling a person to view/observe alphanumeric/pictorial information provided upon a surface of an information storage cassette while being located within an associated case, container, enclosure, housing or the like that is adapted for placement in one-above-the-other relationship and/or in side-by-side relationship in such manner that the information to be viewed/observed is out of direct line of vision of the viewer thereof. The library case, container, enclosure, housing or the like incorporates means for establishing at least one optical path within the case, container enclosure, housing or the like and from the information to be viewed and to the associated part/parts of the case, container, enclosure, housing or the like which is/are presentable in a line of direct view of said viewer.

25 Claims, 5 Drawing Sheets

CONTAINER INCLUDING A VIEWING AID

This invention relates to methods of, and apparatus for, facilitating the viewing/inspection of a surface from a direction angularly disposed to such surface.

It is a frequent occurrence that alphanumeric and/or pictorial information provided upon the surface of an article is not readily readable or viewable for a variety of reasons.

A frequent cause of the difficulty arises from the modes of storage/packaging conventionally used with the articles involved. Another cause of the difficulty arises from the spatial relationship between articles or objects, e.g., instrument gauges, which restricts or prevents frontal viewing.

For example, in the packaging and storage of cassettes containing magnetic tapes, it is a standard practice to provide alphanumeric/pictorial information identifying the nature of the material stored upon the tape and any other information considered relevant to the selection and optimum use of the tape.

The conventional mode of cassette packaging is to house the tape-containing cassette in a generally rectangular container known as a library case, the latter normally including a cassette receiving and positionally locating section, and a so-called flip-up lid section.

Other forms of library case hold two cassettes side-by-side with their faces in the same plane or with their edges in the same plane.

For convenience, throughout this specification, that part of the library case or similar container, in which the article carrying the information to be read will be located, will be regarded as a base section, and the portion pivoted or otherwise associated with the base section, as the lid section.

It is also convenient to note that, whilst the following description and discussions in relation to the present invention will be centered around the application of the concepts of the invention to the combination of audio cassette tapes and associated library cases and to the identification of the content thereof, the invention can be applied to the storage of and to the subsequent identification of, other forms of storage media such as video cassettes, computer cassettes, compact discs, and to other objects/material when housed within associated storage cases or like containers.

The present invention is also applicable to the reading, identification, and viewing, of material/information from a direction which does not allow such to occur without use of the concepts of the present invention.

The base and lid sections are constructed in such manner that the cassette needs to be correctly orientated within the container for the lid section to close.

In practice, alphanumeric/pictorial information provided upon a major surface of a cassette can be readily viewed, and, in addition, in the event that the library case is provided with additional information along a second major surface of the cassette, the content of the library case can usually be identified by reading unaided the information provided on one or the other or both, of the major surfaces provided with such information.

Provided that the library case is transparent it is readily possible to read the information provided upon a tape cassette when stored in its protective library case and when handling the library cases individually. However, difficulties have been found to arise when it is desired to view the identifying information for one or a number of tape cassettes whilst their library cases are stacked either one-above-the-other or side-by-side, with or without a secondary container designed to house a plurality of tape cassette library cases. As will be appreciated, in each such stacking orientation, all of the information provided upon the major surfaces of the cassettes (except perhaps for that on any outermost cassette) is obscured as a result of the stacking involved.

In other words in the absence of replication of information directly on or otherwise by use of, those surfaces of the library cases that remain exposed following the packaging/stacking or on the exposed surfaces of a secondary container, it is necessary to remove individual library cases from the storage arrangements to enable examination of the content of the housed cassette.

It is an object of the present invention to facilitate, for example, the identification of individual articles such as tape cassettes when arranged as a stack or in a side-by-side arrangement.

Broadly, according to a first aspect of the invention there is provided a method of enabling a person to view/observe a surface of an object located within a case, container enclosure, housing or the like in such manner that the surface to be viewed is out of direct line of sight of the viewer thereof, characterised by the step of providing at least one optical path from the surface to be viewed to associated part/parts of the case, container, enclosure, housing or the like which part/parts is/are presentable to a line of direct view of said viewer.

Preferably, each the case, container, enclosure, housing or the like is adapted for placement with respect to at least one other case, container, enclosure, housing or the like in one-above-the-other relationship and/or in side-by-side relationship.

In accordance with a further aspect of the invention there is provided an arrangement for enabling a person to view/observe a surface of an object located within a closure/container/housing in such manner that the surface to be viewed is out of direct line of the viewer thereof, characterised in that the case, container, enclosure, housing incorporates means for providing at least one optical path between the surface to be viewed and associated part/parts of the case, container, enclosure, housing which is/are presentable in line of direct view of said viewer.

Preferably, when it is desired to enable a person to view/observe alphanumeric/pictorial information provided upon a surface of an information storage cassette whilst being located within an associated case, container enclosure, container, housing or the like in such manner that the information to be viewed/observed is out of direct line of sight of the viewer thereof, characterised in that the case, container, enclosure, housing or the like incorporates means for establishing at least one optical path within case, container, enclosure, housing or the like and from the information to be viewed to associated part/parts of the case, container, enclosure, housing or the like which is/are presentable in a line of direct view of said viewer.

For a better understanding of the invention and to show how to carry the same into effect reference will now be made to the accompanying drawings in which.

Figure 1:
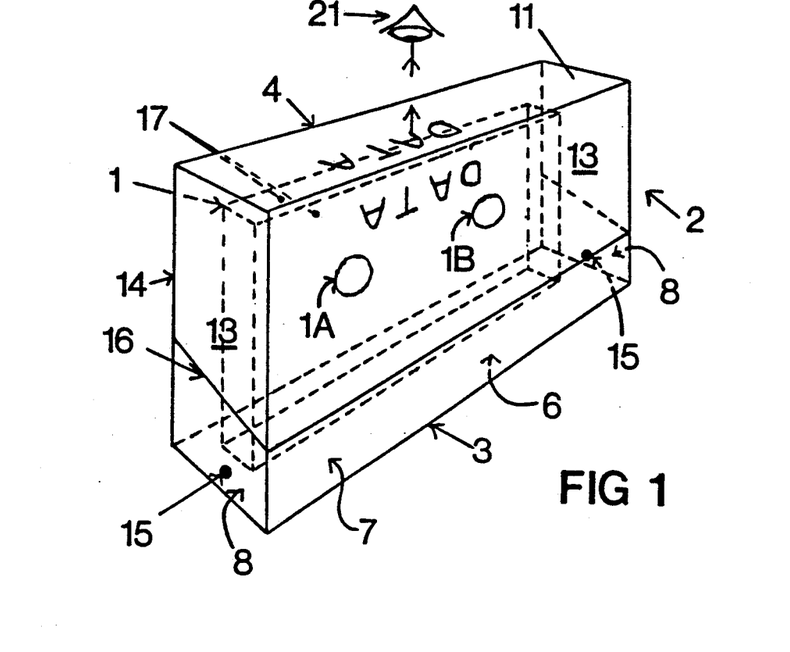
FIG. 1 is a perspective, schematic, view illustrating a library case and associated storage media cassette, the case incorporating a first embodiment of the invention.
Figures 2A, 2B:
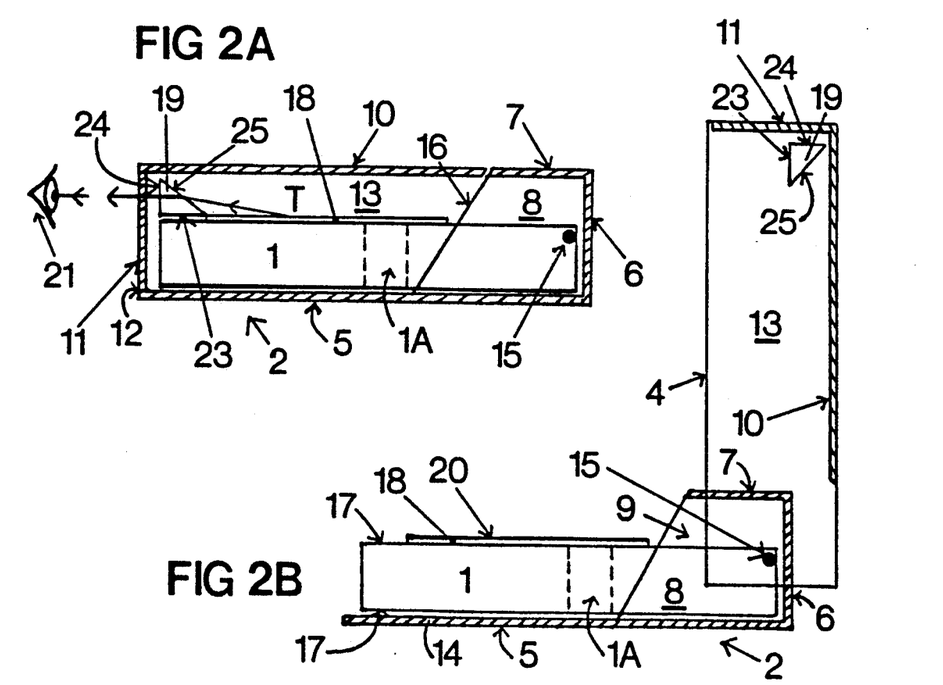
FIG. 2A schematically illustrates a part sectional end view of the library case of FIG. 1, when the case is closed and when housing a cassette, the case incorporating a second embodiment of the invention.
FIG. 2B schematically illustrates a part sectional end view of the library case of FIG. 1, the case being illustrated in an open position in which cassettes can be inserted or removed and incorporating a second embodiment of the invention.

Referring, now, to the drawings, and more particularly to FIGS. 1, 2A and 2B, a conventionally constructed cassette 1 containing a length of magnetic tape transferable between two rotatable spools 1A, 1B (FIG. 1) by suitable drive arrangements (not shown) is housed within a so-called library case 2.

The library case 2 comprises a base section 3, and a lid section 4. The base section includes a flat rectangular base 5, a rear wall 6 (whose longitudinal direction is lengthwise of the cassette), a relatively narrow, as compared with the width of the base, top panel 7 projecting inwardly from the rear wall 6 and at right angles thereto, and two relatively short end walls 8 which are effective to form with the base 5, the rear wall 6, and the top panel 7 a pocket 9 for locatably receiving a lengthwise portion of the cassette 1 and, in particular, the exposed tape edge of the cassette.

The lid section 4 comprises a flat top panel 10, a front wall 11 extending at right angles to the plane of the panel 10, together with two end walls 13 arranged at right angles to both the panel 10 and the front wall 11. The lower edge 12 of the front wall 11 is in contact with the extreme end of the inner face 9 of the rectangular base section 5 so as to form one flat face when the case is closed. The length of the end walls 13 is substantially the same as that of the end edges 14 of the base section 3. The lid section 4 is pivotally mounted to the base section 3 by hinge connections 15, incorporating inwardly directed pins (not separately shown) on the lid section end walls engaging with holes (not separately shown) provided in the end walls 8 of the base section 3. Stop means (not shown) can be provided for ensuring that the lid section 4 can only open outwardly as far as the laid out flat position in which the planes of the base 5 and panel 10 are effectively parallel to each other.

For convenience in the drawings, the cassette tape sprocket locating pins/lugs conventionally provided on a library case lid section have not been shown.

Also, when the lid section is closed, as is shown in FIGS. 1, 2A a continuous top surface to the library case is provided.

Referring now, more particularly, to FIG. 1 this, inter alia, shows a library case and associated cassette, arranged with one of the major faces 17 of the cassette in a generally vertical orientation. It is a common practice to provide, on both of the major faces of cassettes paper or card labels 18 on which alphanumeric and/or pictorial information is printed.

From FIG. 1 it will be clear that, for a transparent case, since such information is provided upon both major faces of the cassette, the information is visible on looking at the library case from a direction opposite either the upper or the lower face thereof.

Figure 3:
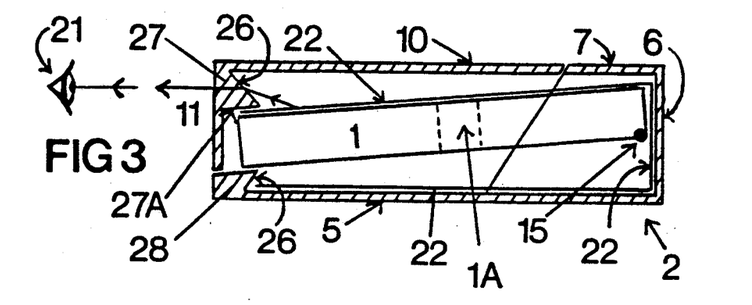
FIG. 3 is a part sectional end view of a second form of library case in which the cassette is housed in an inclined setting, and which incorporates a modified form of the arrangements of the invention.

In addition, as may be noted from FIG. 3, in situations in which the content of the tape has been pre-recorded there is the likelihood that a pre-printed information sheet or inlay card will be provided, such sheets usually being of such form as effectively to line the internal surfaces of the base 5, the rear wall 6 and the top panel 7 thereby to provide for the display of information over an area including the base 5, the wall 6, and the top panel 7, and sometimes, the top panel 10.

In the absence of such a printed information sheet information as to the content of the cassette will not normally be clearly visible when looking at the cassette through the end wall 6.

Blank cassettes are provided with a blank inlay card on which the user writes information about the material recorded on the cassette tape. This will necessitate duplication of information which is written on the labels fixed on the faces of the cassette.

The proposals of the present invention obviate the need for this task.

Furthermore, often, when one is going to use a fresh cassette in a recorder/player, the library case for the cassette just used is not readily available.

Consequently, there is a tendency to use the one which contains the cassette which is to be used next. This eventually results in many cassettes being in the wrong cases.

The use of cases incorporating the principles of the present invention eliminate this problem.

All such cases can be temporarily "reverse stacked" so that the wall 11 is visible to the user, until the user is ready to relocate cassettes in cases along with their respective inlay cards.

Thus, as has been previously mentioned, when a plurality of the cases with cassettes therein are stacked to form a vertical column, or a side-by-side formation, either of which may be free standing or contained in a secondary housing, rack or the like, only the information associated with the outermost cassettes can be read without disturbing the stack, in the absence of a printed information sheet. To be able to read the information on the remaining cases the individual library cases have to be removed from the stack or side-by-side arrangement.

As so far discussed, the library case/cassette combination is essentially of standard construction.

In accordance with the proposals of the invention means are provided for creating an optical path which makes it possible to look into the case by way of a side and/or end wall, the optical path being such as to enable a person to read at least a proportion of the information provided upon one of the cassette major faces.

In general, as has been mentioned the optical path is formed by introducing at least one optical element into the library case in such manner that the element has the optical function of enabling the viewer to look into an end/side wall of the library case and to be able to observe a predetermined region of the information provided upon the surface of the cassette and which is located in a plane transverse to the plane of the end/side wall of the library case. The optical element can be constituted by a prism, Fresnel prism or lens or other suitable like optical element(s) or combinations thereof.

Light reflected, or otherwise emerging, from the face of the cassette, is refracted by the prism, or prism combination, according to Snell's Law of Refraction, at the hypotenuse face of the prisms and emerges via an end/-side wall of the library case.

As shown in FIGS. 2A and 2B a prism 19 is provided within the library case 2. This prism is so positioned and optically orientated that information provided upon a sheet, label or card 18 provided upon a cassette main surface and occupying a particular location on the cassette main surface can, when the cassette is housed in the library case, be seen by an eye located at a viewing position related to the nature and location of the prism.

A representation of an eye 21 indicates the viewing direction in FIGS. 1 and 2A. The relative positioning of the prism 19 with respect to the upper surface 20 of a label on the cassette I housed in the library case can be seen particularly from FIG. 2A.

As will be seen, the prism 19 is so mounted that the lower surface 23 thereof is parallel with the general plane of the surface 20 of the label 18 and with that of the cassette surface 17; the vertical surface 24 is parallel with the case wall 11; and the inclined surface 25 is arranged at an angle determined by the particular function of the prism.

In the FIGS. 2A and 2B a right prism is shown. The prism 19 illustrated, extends, in practice, for the full width of the lid section 4. It should be noted that in the Figure the prism has been shown moved away from the wall 11 for the purposes of clarity in the drawings.

With this arrangement, light reflected from the written-on face of the cassette at the point T, meets the inclined face 25 of the prism 19 where it is refracted towards the vertical surface 24 and from which it emerges approximately at right angles to that surface and hence at right angles to the front face 11 of the lid section 4.

The optical path provided thus functions to present to the viewer's eye 21, an image of the information written on the surface of the cassette. FIG. 1 shows very schematically how the word DATA written on the cassette surface, is presented to the viewer's eye. For convenience in the drawing, the eye is shown close to the viewing face or wall 11 of the case. In practice, it would be no closer than the closest point for which the eye can clearly focus, known as the near point.

From the foregoing it will be clear that, provided that the case 2 is transparent, any alphanumeric or pictorial information on the cassette will be visible to the observer by viewing through the top panel 10 of the lid section 4 and the transparent base panel 5 of the base section 3. If, however, a number of the cases are stacked or arranged side-by-side, the information on all of the cassettes, with the exception of the outer two, will not be visible to the viewer of the stack etc. Also it is frequently found that even when a library case is out of such a stack the information is not necessarily visible if any paper inserts or the like (not shown in FIGS. 2A and 2B), obscure the cassette on either or both main surfaces or if the side faces of the case are not transparent.

If library cases incorporating the concepts of the invention are stacked one above the other or arranged side-by-side, and the library case front wall 11, having the prism 19 adjacent to it, is presented towards the viewer, the prism will allow writing on a label positioned beyond the inclined face 25 of the prism 19, on the surface 17 of the cassette to be seen by the observer looking into the front wall 11.

The prism wall will also allow the writing on an inlay card, which has holes cut to take the spool holders of the library case and which overlays the existing label of the cassette to be read similarly.

As is illustrated in FIG. 3 especially designed inlay cards 22 provide for novel applications of embodiments of the invention.

The particular location for the prism within the library case will be related to the positioning of the alphanumeric and/or pictorial information to be viewed whilst a cassette is located within its library case.

It will also be appreciated that the field of view of the prism is related to the physical dimensions of the prism and that these dimensions are related to the space available for a prism within the library case.

In other words, the larger the case, the larger the possible sizes for prisms and thus the larger the possible size for the area that can be viewed. However, in this connection, it is to be noted that it is not convenient to provide larger sized library cases in view of the considerable standardisation of the dimensions of library cases as a result of standardisation of cassette dimensions and of racking dimensions.

Under the constraints placed by the dimensions of existing library cases, it is correct to say, however, that the greater the inclination of the hypotenuse face 25 of the prism 19, with respect to the cassette surface, the greater the depth of the object field (i.e., the depth of the label on the cassette face) that can be read.

This greater depth of field necessarily means that the size of the text observed via the end wall 11 is reduced. Conversely, the smaller the inclination of the face 25 with respect to the cassette surface, the smaller will be the depth of field. In this latter case the available "viewing window", via the wall 11, will be devoted to a smaller depth of text and consequently, that text will appear larger than will the same elements of it when viewed through the prism whose hypotenuse face 25 has greater inclination with the face of the cassette.

Whilst the FIGS. 2A and 2B illustrate the prism located in the lid section, it is possible for the prism to be located in the base section provided that the provision of the prism does not prevent, or otherwise interfere with, the engagement of a cassette within the library case.

Furthermore, if considered appropriate, prisms could be provided in both said sections, and if needs be more than one prism can be provided in each section.

Prisms could also be fixed or formed in other parts of the library case in order to provide views of other parts of the cassette as is desired.

For convenience, the arrangement of FIGS. 1, 2A and 2B, relates to a library case in which the cassette 'packs flat'. A more realistic variation is shown in FIG. 3 in which the cassette, when housed in its library case, is bodily inclined at an angle of approximately two degrees with the base section base panel.

The embodiment in FIG. 3 incorporates two prisms, one 27 integral with the lid section 4 and a second 28 integral with the base section 3 thereby enabling simultaneous viewing of regions upon opposite major faces of the cassette. The hypotenuse faces of prisms 27 and 28 are designated 26 whilst the horizontal base face of prism 27 is designated 27A. FIG. 3 demonstrates that information written on an inlay card 22 (having holes cut to take the spool holders, not shown, necessary for preventing rotation of the spools when the cassette is cased) can be read via prism 27.

The prisms 27 and 28 could be formed during the actual construction of the base section i.e., the prisms could be 'moulded-in'. To facilitate such moulding, the prism and wall with which a prism is associated could be moulded as a separate combined element from the remainder of the lid or base section the prism, and the wall/prism element subsequently connected to the remainder of the associated lid or base section. Alternatively the prisms could be added at a post moulding stage of the production of the library case incorporating the concepts of the invention.

In either case, those faces of the prisms which would normally be horizontal, are now inclined so as to follow the inclined contour of the cassette in the library case.

With the particular siting of the base prism 28 discussed, there is a possibility that the prism 28 could interfere with the loading of a cassette into the base. In practice, this factor might not be so important for normal everyday use but might be so for automatic loading of cassettes into cases on a factory production line.

The relative sizes of these prisms will, in practice, be related to the relative dimensions of the cassette, the housing, and the space available as a result of the inclined arrangement of the housed cassette. Also, as already explained, the relative sizes of the images seen via the prisms will be related to the relative sizes of the prisms. As shown, prism 28 is smaller than prism 27 so that the image will be correspondingly smaller.

However, prisms 27 and 28 can be of equal size or any other relative sizes, as desired, and sufficient information concerning the general nature of the contents of the cassette can always be provided on only one side-face of the cassette. Thus prism 28 can be eliminated, if desired. Furthermore, the prism angles can be chosen appropriate to the reading task to be performed.

Figure 4:
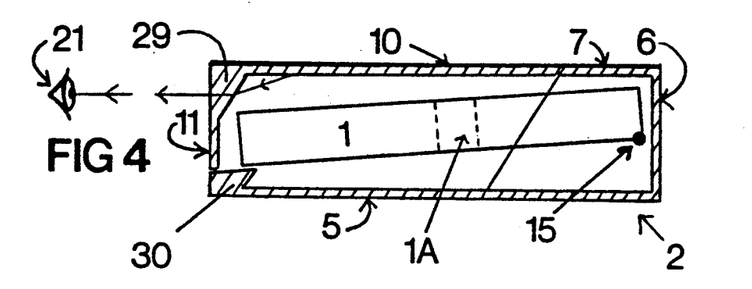
FIG. 4 is a part sectional end view of the library case of FIG. 3, and which incorporates a further variation of the arrangements of the invention.

It will be appreciated that if the prism 27 is physically rotated so that the hypotenuse face 26 of the triangular shaped prism rises from the inner face of the flat panel 10 of the lid section 4 of the library case, as shown in FIG. 4, instead of from the cassette face, as shown in FIG. 3, the viewer will be able to read information written on a label placed on the inward facing face of an inlay card (having holes cut to take the spool holders of the case) located inside the case. This will prevent the need for having to remove a conventional inlay card in order to write on the outward facing part normally seen via the transparent wall 6 of the library case. Alternatively, a label fixed on the inside of panel 10 could be read similarly. It is interesting to note, however, that conventional indexing via the inlay card can continue, if desired, because the invention does not interfere with it. The library case merely needs to be "reverse stacked" in order to utilise the principles of the invention.

For a prism fixed or formed in this configuration, it is also possible to read information written, for example, by means of a pen, on the outside of the library case on the appropriate part of the outer surface of the lid section 4 of the case via the phenomenon of total internal reflection at the inner hypotenuse face of a prism 29. This writing will appear inverted to an observer looking directly at the inside face of the transparent lid, but, because of reflection at the hypotenuse face, it will appear correctly oriented when viewed via the front wall 11 of the lid section 4.

Figure 5A:
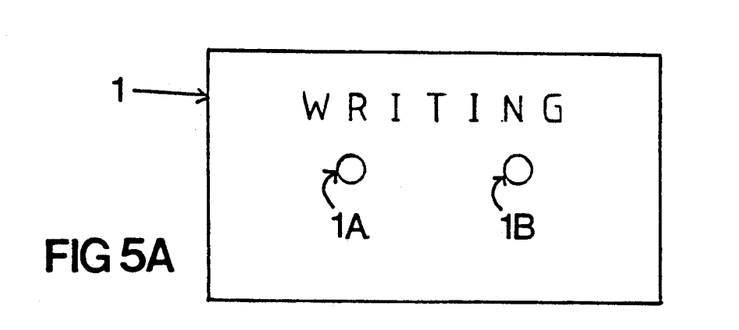
FIG. 5A illustrates, schematically, a plan view of writing on a cassette.
Figure 5B:
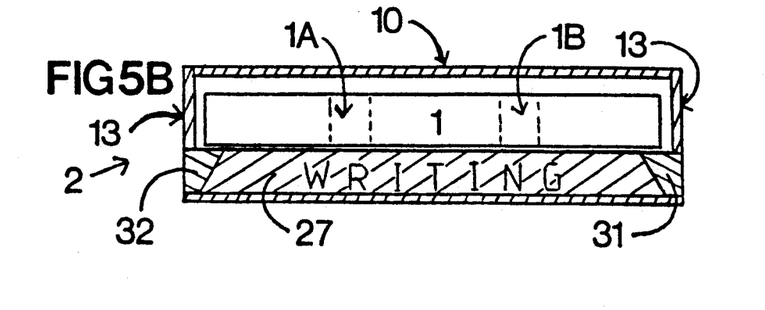
FIG. 5B illustrates, schematically, the function of the FIG. 3 embodiment of the invention.

Referring now to FIGS. 5A and 5B these illustrate a modified arrangement utilising the concepts of the invention involving the use of additional prisms 31, 32 arranged so as to lie along a direction at right angles to the previously discussed prisms 19 and 27 of FIGS. 2A, 2B, and 3. FIG. 5A shows how the word "WRITING" on a cassette appears when viewed from a position at right angles with the cassette surface.

FIG. 5B shows how the word "WRITING" on the flat surface of the cassette is seen via prism 27 through the front wall 11 of the library case.

The provision of the additional prisms 31 and 32 enables viewing into the interior of the library case by way of the end walls 13, of the library case. This view would be necessary if the library cases were to be stacked side-by-side so that only the short end face of each case was visible.

Figure 6A:
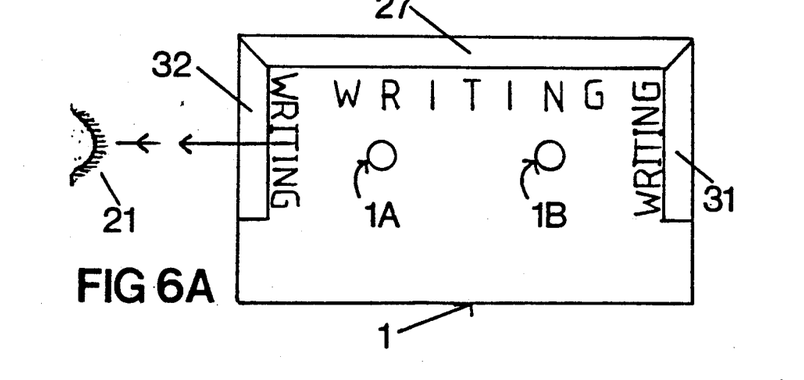
FIG. 6A illustrates schematically writing on a cassette, in relation to an embodiment of the invention.
Figure 6B:
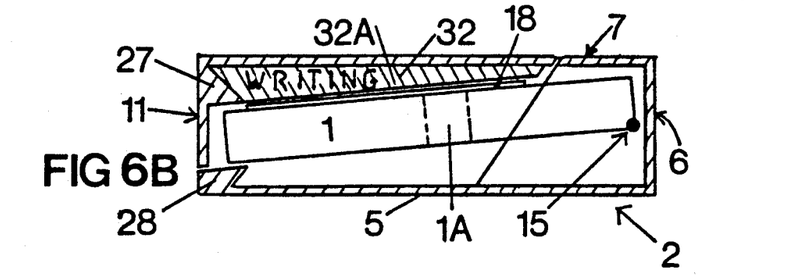
FIG. 6B is a part sectional end view of the library case of FIG. 1 similar to that of FIG. 3 but showing a further embodiment of the invention.

The orientation of the prisms 27, 31, and 32, with respect to the information written on the cassette, is shown in FIG. 6A which represents a plan view. FIG. 6B shows how the word "WRITING" next to prism 32 in FIG. 6A, is seen via prism 32 through the end wall 13 of the library case.

In the situation of an inclined cassette which includes three prisms, the prisms associated with the end walls i.e., prisms 31,32 will need to taper along their lengths towards the rear wall 6 of the library case to accommodate the cassette inclination within the library case. This is to ensure that the prism lower surfaces 32A and 33A (not shown) are parallel to the surface of the cassette when it is inclined within the case. Prism 27 has its lower face (27A, FIG. 3) inclined accordingly so that the ninety degree angle of prism 19 becomes about eighty eight degrees for prism 27.

The prisms 31,32 are designed so as to enable the required object range to be viewed by an observer whose line of sight is approximately at right angles with respect to an end wall 13 of the library case. Appropriate choice of prism angles will allow the main view to be obtained from suitable alternative directions and will also allow selected parts of the writing on the cassette to be seen. As already stated, the greater the slope of the hypotenuse face 25 of the prism 19, the greater the depth of the object field viewed and vice versa. The greater the depth of field, the smaller will the writing appear.

Also as the position of the observer alters, an enlarged image of just part of the writing can be seen.

The prisms are also designed so that light entering them does not undergo total internal reflection at the face 25 and, therefore, does not interfere with the desired view of the writing on the cassette that is to be read.

The phenomenon of Total Internal Reflection is well understood and methods are available for controlling its extent. An understanding of the geometry of the prisms utilised in the implementation of the principles of the invention, together with the application of the principles of optics, will reveal that the angles of prisms such as 19 and 27 will dictate the viewing ranges over which interfering reflections at the hypotenuse face of these prisms will occur.

As the hypotenuse face 25 becomes more vertical, reflections of the writing immediately beneath the base face 23 will tend to be directed away from the desired viewing direction which is approximately at right angles with the viewing face of the case. However, the depth of the viewed object field will be greater, for this more vertical hypotenuse face and one may wish to limit this depth of field in order to ensure that the observed text is not too small. These two factors are thus in conflict with one another and a compromise may be necessary.

However, if interfering reflections cannot be eliminated by choice of prism geometry, other techniques can be employed.

Thus, the base faces 23 and 27A can be roughened or darkened or the cassette surface upon which they rest can be dark in colour or otherwise made inconspicuous. Alternatively, the hypotenuse faces 25 and 26 can be treated with an anti-reflective coating. Incidently, conversely, the function of prism 29 as a reflector could be enhanced by applying a reflective coating or by using a mirror instead.

If desired, special effects can be produced by mixing images resulting from reflected and refracted light and it is possible to have the observer view an image obtained either totally by reflection or totally by refraction or by a combination of the two.

The image obtained by reflection will, of course, be inverted so that attempts at superimposition of images should recognise this fact.

Under certain conditions it may be desirable to reduce, or eliminate, unwanted reflections at the outer and inner faces of the walls of the library case. It is also important to maximise the amount of light which enters the library case.

The maximisation of such light entering and leaving the case can be achieved in a variety of ways, for example, by utilising optical fibre arrangements; by providing auxiliary lighting; by the provision of light cells etc.

Figure 7:
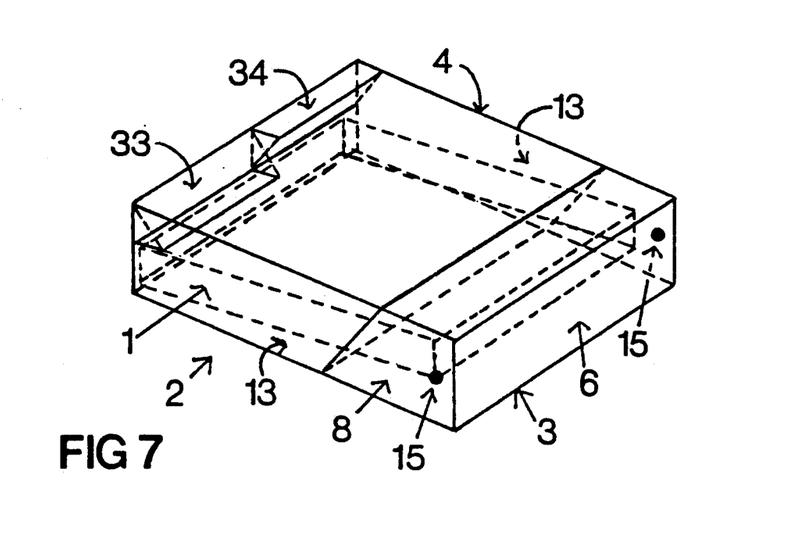
FIG. 7 is a schematic perspective view of a further embodiment of the invention.

FIG. 7 illustrates in perspective view, a library case incorporating, instead of a single prism along a side/end wall two prisms 33,34 which perform the function of prisms 27 and 29, respectively, in FIGS. 3 and 4. With this arrangement the nature of the information provided upon a cassette, and inside a library case, can be related to the fact that there are two distinct viewing zones by way of the prisms.

One application for this arrangement would be to write information concerning side 1 of the cassette on the cassette so that it could be seen via prism 33, and to write information concerning side 2 of the cassette on a label or inlay card so that it could be seen via prism 34.

Alternatively, prism 33 could be used to view writing on the cassette which referred to "main title" information on sides 1 and 2 of the cassette tape, whilst the prism 34 was used for viewing more detailed information about the recorded material. This would allow such latter information to be written down whilst recording or playing was in progress i.e., whilst the library case was empty, and would then allow the main title and the detailed information, to be linked when the cassette was "cased" and "re-stacked".

Information about side 1 can always be grouped with that for side 2 of the cassette and vice versa.

It would also be possible to read the writing on an adjacent cassette or inlay card by means of a prism 34 through the transparent faces of rectangular panels, 10 and 5, of adjacent library cases.

For clarity in the Drawings, FIG. 7 shows the cassette 1 deeper than it is in practice. The Figure, does, however, illustrate in general, the use of the invention for viewing stored objects, articles etc.

As has been mentioned above it is possible to use a Fresnel prism combination as the optical element.

Figure 8:
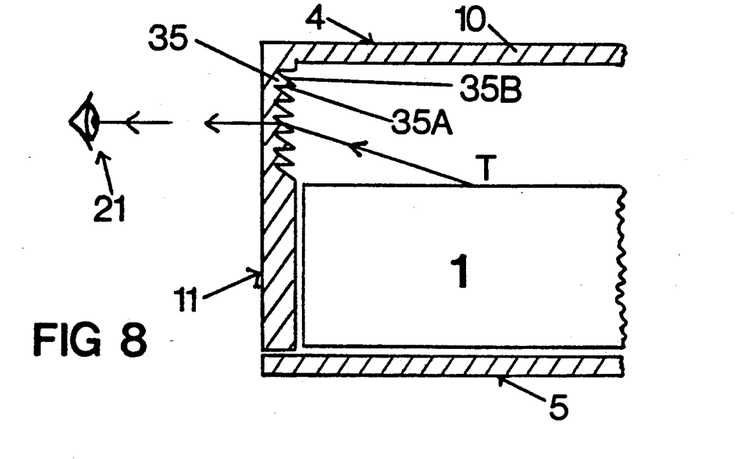
FIG. 8 is a fragmentary enlarged sectional view of a still further embodiment of a container construction incorporating the concepts of the invention.

FIG. 8 illustrates an embodiment of the invention utilising a Fresnel prism combination as the optical element. In FIG. 8 the Fresnel prism combination elements 35 are provided in the lid section 4. The Fresnel prism elements can be provided by introducing such a combination into the previously formed library case or alternatively the Fresnel prism combination can be formed during the moulding of the components of the library case.

In order to show how the image of the writing on the cassette reaches the eyes via the Fresnel prism combination a ray of light has been drawn from a point T on the surface of the cassette 1 to meet the hypotenuse face 35B of the Fresnel prism element 35 where it is refracted so as to emerge from the wall 11 of the lid of the library case at right angles to the surface of the wall. It then travels towards the eye 21.

If magnification (or reduction) and rotational translation of the object field to be viewed are required, then a specially constructed Fresnel lens having curvature of its prism elements within the plane of the wall 11, will be required.

If only rotational translation of the object field is required, then the prism elements 35 will all be parallel with no necessity for curvature.

The existance of the base faces 35A of the individual prism elements 35 necessarily eliminates very small parts of the object field from the image field. This effect can be minimised by minimising the length of the base faces 35A and hence by increasing the angle which the hypotenuse faces 35B, of the prism elements, make with the face of the cassette. This necessarily increases the depth of the object field that can be viewed at the expense of the size of individual characters in the writing. A compromise will, therefore, be necessary.

In practice, the use of the Fresnel prism elements allows the full length of a wall to be utilised so as to enable both sides of a cassette, or other object housed in the case.

Figure 9A:
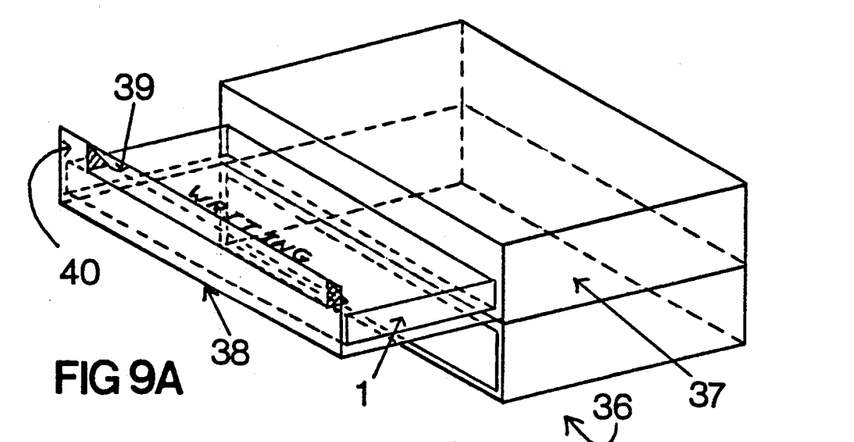
FIG. 9A illustrates, in a perspective view, an embodiment of a container construction involving two trays each adapted for receiving a cassette or the like, and incorporating the concepts of the invention, the Figure illustrating one of the trays in its open position.
Figure 9B:
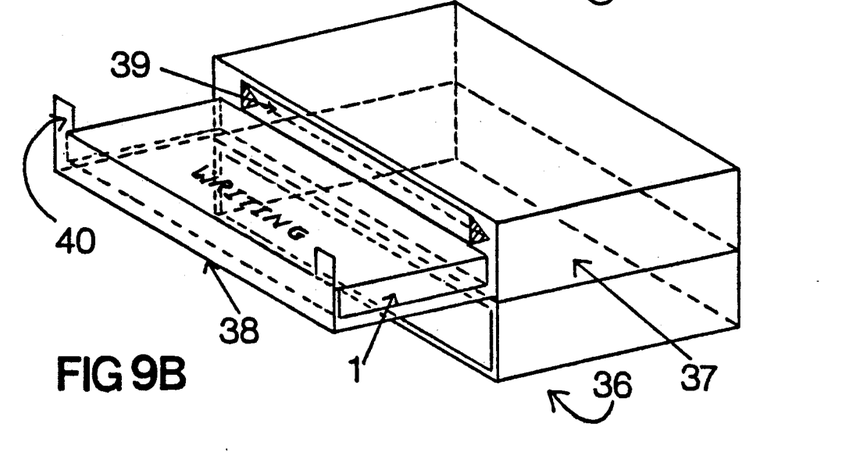
FIG. 9B, illustrates, in perspective view, a further embodiment of container construction involving two trays each adapted for receiving a cassette or the like, and incorporating the concepts of the invention, the Figure illustrating one of the trays in its open position.
Figure 9C:
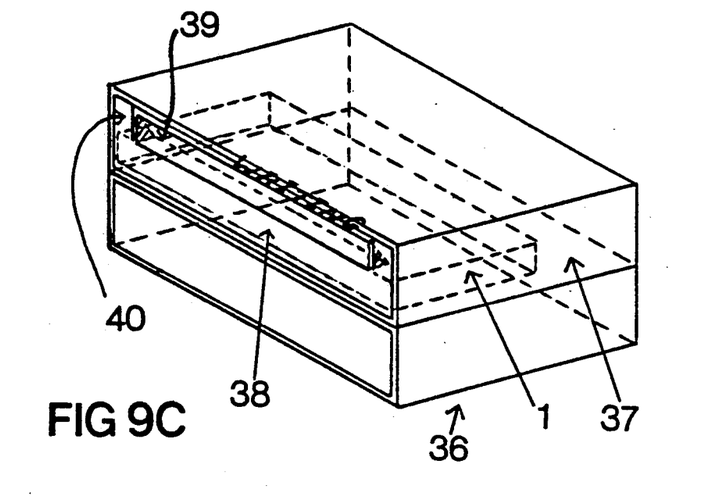
FIG. 9C, illustrates, in perspective view, the embodiment of FIG. 9A or 9B when both trays are closed.

FIGS. 9A to 9C illustrate, schematically, the extension of the concepts of the invention to a cabinet 36 form of storage arrangement which has a main housing 37 adapted to accommodate two or more drawers/trays 38 for receiving objects such as cassettes 1. In FIGS. 9A to 9C, in accordance with the concepts of the invention, a prism 39 extends lengthwise of the front panel 40 of the drawer/tray 38.

Each such drawer/tray 38 has an associated prism 39 (see FIG. 9A) which is oriented with respect to the cassettes or other objects in the same way as that of the prism 19 utilised in the embodiment of FIG. 2A.

In a variation of this cabinet arrangement (see FIG. 9B) the prisms can be mounted to the cabinet housing rather than the drawers/trays. In this case the prisms would be mounted on the inside of the housing front panels immediately above the drawer/tray receiving mouth.

FIG. 9C shows the embodiments of FIGS. 9A and 9B for the closed positions of the drawers/trays.

Figure 9D:
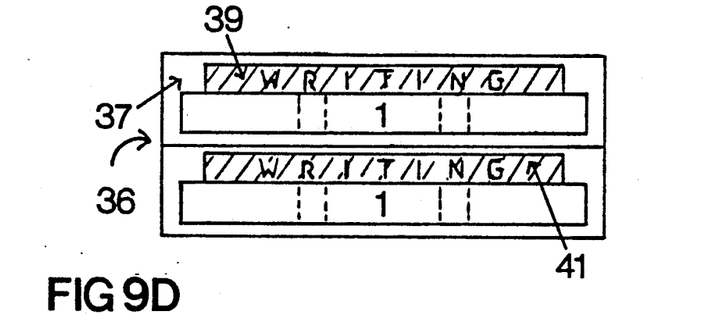
FIG. 9D, is an end view of the embodiments of FIGS. 9A to 9C, as seen from a viewer's position.

The appearance of the words "WRITING" to an observer looking into the prisms 39 and 41 mounted in the drawers/trays of FIG. 9A, 9B and 9C (only one prism being shown in this Figure) is shown in FIG. 9D.

Figure 10:
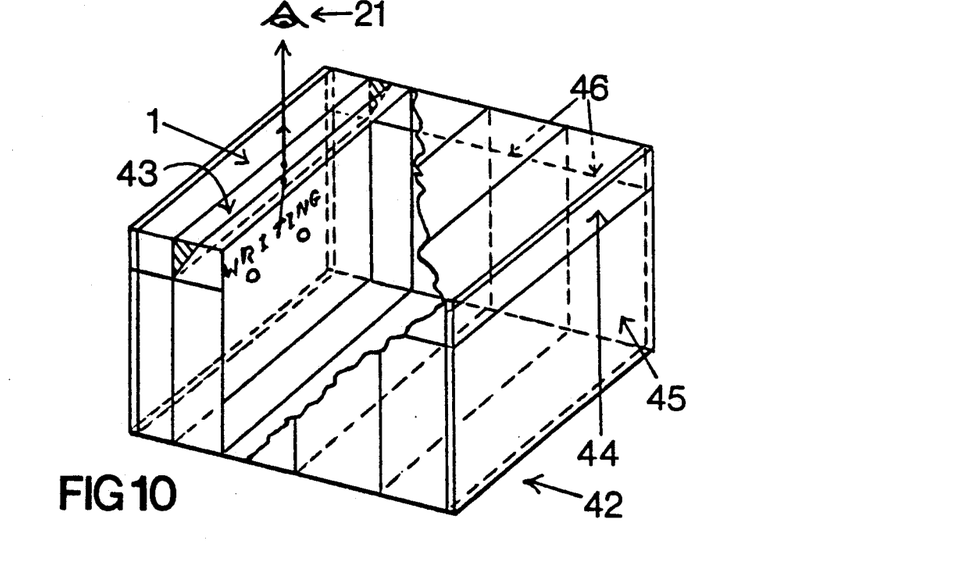
FIG. 10 schematically illustrates, in perspective view, a unit for receiving a plurality of cassettes, the unit incorporating a main body and a common lid section, and incorporating the concepts of the invention.

FIG. 10 shows another variant in which at least one prism 43 is contained in a flip top lid 44 which closes down to the main body of a case 45 by means of hinge connections 46 so that the writing on an individual cassette or cassettes 1 can be viewed via the prism or prisms.

This variant lends itself to many possible uses such as, use for storing and retrieving index or filing cards, microscope slides or photographs and similar use/applications in other areas i.e., usage in relation to the viewing of biological/geological specimens or otherwise monitoring them.

In those types of cassette rack which just hold the cassettes without the use of separate library cases prisms mounted as part of the front face of the rack according to the principles already described, will provide convenient means for accessing particular cassettes without the need for written indexing which is external to the rack. Such racks are usually utilised for carrying cassettes about, or in motor vehicles, and they are often constructed so that the cassette is ejected by means of a spring mechanism where the cassette can be locked back into the stored position by gently pushing the cassette carrier back into its housing.

The principles embodied in this invention can be applied in a specially designed outer case which is larger than conventional cases and which provides for optimum viewing of the cassette side-face information via the end/side faces of the case. This is particularly relevant for viewing compact discs or video cassettes where conventional casing does not provide so much room for incorporating optical media.

In discussing the above various embodiments, the various conventional prisms/Fresnels prism arrangements have been permanently fixed or formed with respect to the remainder of the library case. If desired, however, the prisms/lenses can be mounted so as to be positionally adjustable to facilitate the setting of optimum viewing conditions. The prisms could also be designed so as to be re-usable in another case if the existing case should become damaged or otherwise unusable. In practice, the prisms can be made available in 'kit form' in which a number of prisms and suitable adhesive may be supplied as a package for user application to cassette library cases.

It will be appreciated that the cases, containers, housings or the like are preferably formed from any suitable materials such as plastics materials which according to requirements exhibit the requisite optical properties in the case of those parts involved in the optical arrangements. Thus the selection of the plastics material used can inter alia take into account the refractive index of the material whereby the particular angular relationships of the prisms produced therefrom can be such as not only to achieve requisite optical performance, but also take into account manufacturing problems such as can arise in relation to the moulding of articles.

Also, it should be appreciated that whilst the above discussion has particularly related to standard sized audio cassettes the features of the invention are applicable to other sized audio cassettes such as micro-cassettes.

The foregoing description has concentrated upon prisms fixed or formed in the lid section of the library case. In practice, a similar combination of the various prisms could be formed in the base section of the library case.

With reference to the foregoing description, it is pointed out that auxiliary lighting, whether powered by batteries or other means, could be utilised to improve viewing of the relevant material. Fibre optics techniques could be utilised either alone or in conjunction with powered equipment.

It is important to appreciate that any library cases incorporating the embodiments exhibiting the principles of the invention can be used for storing any cassette.

For the normal orientation of the writing on a cassette surface an erect image is obtained only with the prism lower than the cassette. This means that, in general, except where auxiliary lighting is employed, light is not going to reach the cassette surface so readily. For this reason it would be expedient to have the information written "up side down" so that the prism can be above the cassette and so allow light to reach the cassette surface more readily.

Special labels/inlay cards could be designed so as to allow the principles embodied in the invention to be applied more effectively.

The provision of cases or the like incorporating the concepts of the invention makes it possible readily to incorporate and use the facilities of bar coding and the use of laser scanners and similar equipment to view/read the information provided upon the content of the case and/or the case itself. It will be appreciated that the requisite optical element could be included in the bar code reading head.

Also the use of the concepts of the invention makes it possible readily to view information provided in holographic form.

In applications of the concepts of the invention in which inlay cards or the like are not used or where it is possible that the content of the case, container, housing or the like is likely to be subjected to heat, i.e., caused by sunlight suitable heat filtering could be provided to at least reduce the possibility of damage to the content of the case, container, housing or the like.

I claim:

1. In a container for receiving at least one article therein, the article having a region of interest thereon that a person wishes to view while the article is located within the container, said container having a first surface, a transparent second surface extending transversely to the container first surface, and being configured to receive said article within the container with said region of interest of the article positioned adjacent to the container first surface, the improvement comprising a prism coupled to the container for enabling at least a part of said region of interest of the article to be viewed through the transparent second surface of the container when the article is located within the container.

2. A container for receiving at least one article therein, the article having a region of interest thereon that a person wishes to view while the article is located within the container, said container having a first surface and a transparent second surface extending transversely to the first surface, the container being configured to receive said article within the container with said region of interest of the article positioned adjacent to the container first surface, and further comprising optical means coupled to the container for enabling at least a part of said region of interest of the article to be viewed through the transparent second surface of the container.

3. The container as claimed in claim 2, wherein the optical means formed integrally with the container during manufacture of the container.

4. The container as claimed in claim 2, wherein the optical means is adapted for fitting into the container after the manufacture of the container.

5. The container as claimed in claim 2, wherein the optical means comprises at least one optically refractive arrangement.

6. The container as claimed in claim 5, wherein the optically refractive arrangement is prismatic.

7. The container as claimed in claim 2, wherein the optical means comprises at least one optically reflective arrangement.

8. The container as claimed in claim 2, wherein the container further comprises a transparent third surface extending transversely to both said first and second container surfaces, and a second optical means associated with said third surface for enabling a portion of said region of interest of the article to be viewed through said transparent third surface.

9. The container as claimed in claim 5, wherein the two optical means have different physical sizes.

10. The container as claimed in claim 5 wherein the two optical means have the same physical size.

11. The container as claimed in claim 8, wherein the container further comprises a transparent fourth surface extending transversely to both said first, second, and third container surfaces, and third optical means associated with said fourth surface for enabling a portion of said region of interest of the article adjacent to the container first surface to be viewed through the fourth container surface.

12. The container as claimed in claim 11, wherein the three optical means have different physical sizes.

13. The container as claimed in claim 11, wherein the three optical means have the same physical size.

14. The container as claimed in claim 2, wherein the container comprises a first section and a second section pivotally coupled to the first section, each of the first and second sections providing a first surface and a transparent second surface transverse to the first surface, said optical means being associated with at least one of said second surfaces.

15. The container as claimed in claim 14, wherein the optical means comprises a prism.

16. The container as claimed in claim 2, wherein the optical means includes a prism, and in which the angles between adjacent surfaces of the prism are such as to be able to accommodate a predetermined inclination of a said article with respect to the first and second surfaces of the container.

17. The container as claimed in claim 16, wherein the optical means comprises a right prism.

18. The container as claimed in claim 16, wherein the angle between two of the surfaces of the prism lies within the angular range of 88 to 90 degrees.

19. The container as claimed in claim 2, wherein the container is of such shape and form that similar containers are stackable one upon the other in such manner that the first surfaces of all intermediate containers are obscured from direct viewing.

20. The container as claimed in claim 2, wherein the optical means comprises a Fresnel prism.

21. The container as claimed in claim 2, wherein the optical means is located externally of the second surface.

22. A container for receiving a plurality of articles therein, each of articles having a region of interest thereon that a person wishes to view while the article is located within the container, said container having a first surface, a transparent second surface extending transversely to the container first surface, and the container being configured to receive each of said articles within the container with the region of interest of the articles positioned generally parallel to the container first surface, and further comprising optical means coupled to the container for enabling at least a part of said region of each said plurality of articles to be viewed through the second surface of the container.

23. The container as claimed in claim 22, wherein the container has a flip-top lid formation.

24. The container as claimed in claim 22, wherein the articles are positionable with said first surfaces lying in side by side planes.

25. The container as claimed in claim 22, wherein the articles are positionable in at least one layer with said first surfaces of each layer lying in a common plane.

* * * * *